(12) United States Patent
Patterson et al.

(10) Patent No.: US 10,233,740 B2
(45) Date of Patent: Mar. 19, 2019

(54) STICK-SLIP MITIGATION ON DIRECT DRIVE TOP DRIVE SYSTEMS

(71) Applicant: Nabors Drilling Technologies USA, Inc., Houston, TX (US)

(72) Inventors: John Patterson, Cypress, TX (US); Michael Whatley, Houston, TX (US); Faisal Yousef, Houston, TX (US); Mahmoud Hadi, Richmond, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 268 days.

(21) Appl. No.: 15/264,171

(22) Filed: Sep. 13, 2016

(65) Prior Publication Data

US 2018/0073344 A1    Mar. 15, 2018

(51) Int. Cl.
*E21B 44/04* (2006.01)
*E21B 41/00* (2006.01)
*E21B 3/02* (2006.01)
*G05B 19/404* (2006.01)

(52) U.S. Cl.
CPC ............. *E21B 44/04* (2013.01); *E21B 3/02* (2013.01); *E21B 41/0092* (2013.01); *G05B 19/404* (2013.01); *G05B 2219/39241* (2013.01); *G05B 2219/45129* (2013.01)

(58) Field of Classification Search
CPC .................................. E21B 44/00; E21B 44/02
See application file for complete search history.

(56) References Cited

U.S. PATENT DOCUMENTS

| | | | | |
|---|---|---|---|---|
| 7,404,454 | B2* | 7/2008 | Hulick | E21B 4/20 175/26 |
| 7,461,705 | B2* | 12/2008 | Hulick | E21B 3/025 175/24 |
| 8,950,512 | B2* | 2/2015 | Nessjoen | E21B 44/00 175/322 |
| 2014/0305702 | A1* | 10/2014 | Bowley | E21B 44/04 175/27 |

(Continued)

FOREIGN PATENT DOCUMENTS

| | | |
|---|---|---|
| CA | 2035823 A1 | 8/1991 |
| WO | WO 2010-064031 A1 | 6/2010 |

(Continued)

*Primary Examiner* — Kenneth L Thompson
(74) *Attorney, Agent, or Firm* — Haynes and Boone, LLP

(57) ABSTRACT

A control system that mitigates stick-slip vibrations at higher harmonics than currently available is disclosed. A controller of a top drive is set to a torque control mode instead of a speed control mode. The controller receives torque measurements and compares to a target torque value. The controller accelerates or decelerates the top drive by a generated current adjustment command. A slow integration speed control loop, at least an order of magnitude slower in response than the torque control loop, receives a RPM set point. The slow integration speed control loop compares the RPM set point to an actual RPM measurement and generates a torque command. The torque command is sent to the torque control loop which results in an acceleration or deceleration of the top drive to maintain a desired torque amount. The speed of the top drive is bounded by a speed limit control loop.

20 Claims, 6 Drawing Sheets

(56) References Cited

U.S. PATENT DOCUMENTS

| | | | | |
|---|---|---|---|---|
| 2015/0240615 A1* | 8/2015 | Dykstra | ............... | E21B 44/00 |
| | | | | 700/275 |
| 2016/0281488 A1* | 9/2016 | Dwars | ............... | E21B 44/00 |
| 2017/0328193 A1* | 11/2017 | Holt | ............... | E21B 44/02 |
| 2017/0370203 A1* | 12/2017 | Hadi | ............... | G05B 15/02 |
| 2018/0128093 A1* | 5/2018 | Jeffryes | ............... | E21B 45/00 |

FOREIGN PATENT DOCUMENTS

| WO | WO 2013-112056 A1 | 8/2013 |
|---|---|---|
| WO | WO 2014-147116 A1 | 9/2014 |

\* cited by examiner

US 10,233,740 B2

STICK-SLIP MITIGATION ON DIRECT DRIVE TOP DRIVE SYSTEMS

TECHNICAL FIELD

The present disclosure is directed to systems, devices, and methods for optimizing stick-slip mitigation. More specifically, the present disclosure is directed to systems, devices, and methods for mitigating stick-slip with faster response times to handle higher stick-slip harmonics.

BACKGROUND OF THE DISCLOSURE

Underground drilling involves drilling a bore through a formation deep in the Earth using a drill bit connected to a drill string. During rotary drilling, the torque applied at a top drive of a drilling rig is often out of phase with the rotational movement at the bottom-hole assembly (BHA) of the drill string due to an elasticity of the material of the drill string. This causes the drill string to yield somewhat under the opposing loads imposed by the rotational force at the top drive and friction/inertia at the end where the bit is located (e.g., the BHA). This causes resonant motion to occur between the top drive and the BHA that is undesirable. Further, as the drill string winds up along its length due to the ends being out of phase, the torque stored in the winding may exceed any static friction, causing the drill string near the bit to slip relative to the wellbore sides at a high (and often damaging) speed.

Existing approaches to mitigating stick-slip modulate the rotations per minute (RPM) of a top drive of the drilling rig in order to mitigate vibrations occurring down hole, with the goal of keeping a constant, smooth torque at the top drive quill as much as possible. Therefore, these existing approaches modulate RPM to achieve a smooth torque response. To accomplish this, controllers that manage stick-slip mitigation typically utilize a speed control loop in the controller, e.g. an alternating current (AC) drive. However, speed control loops are slower than torque or current control loops in AC drives. The resulting delay of speed control loops in generating RPM commands, and therefrom new torque commands, affects the performance of the stick-slip mitigation system at higher frequencies. This limits the ability of existing approaches to mitigate stick-slip at higher harmonics.

The present disclosure is directed to systems, devices, and methods that overcome one or more of the shortcomings of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
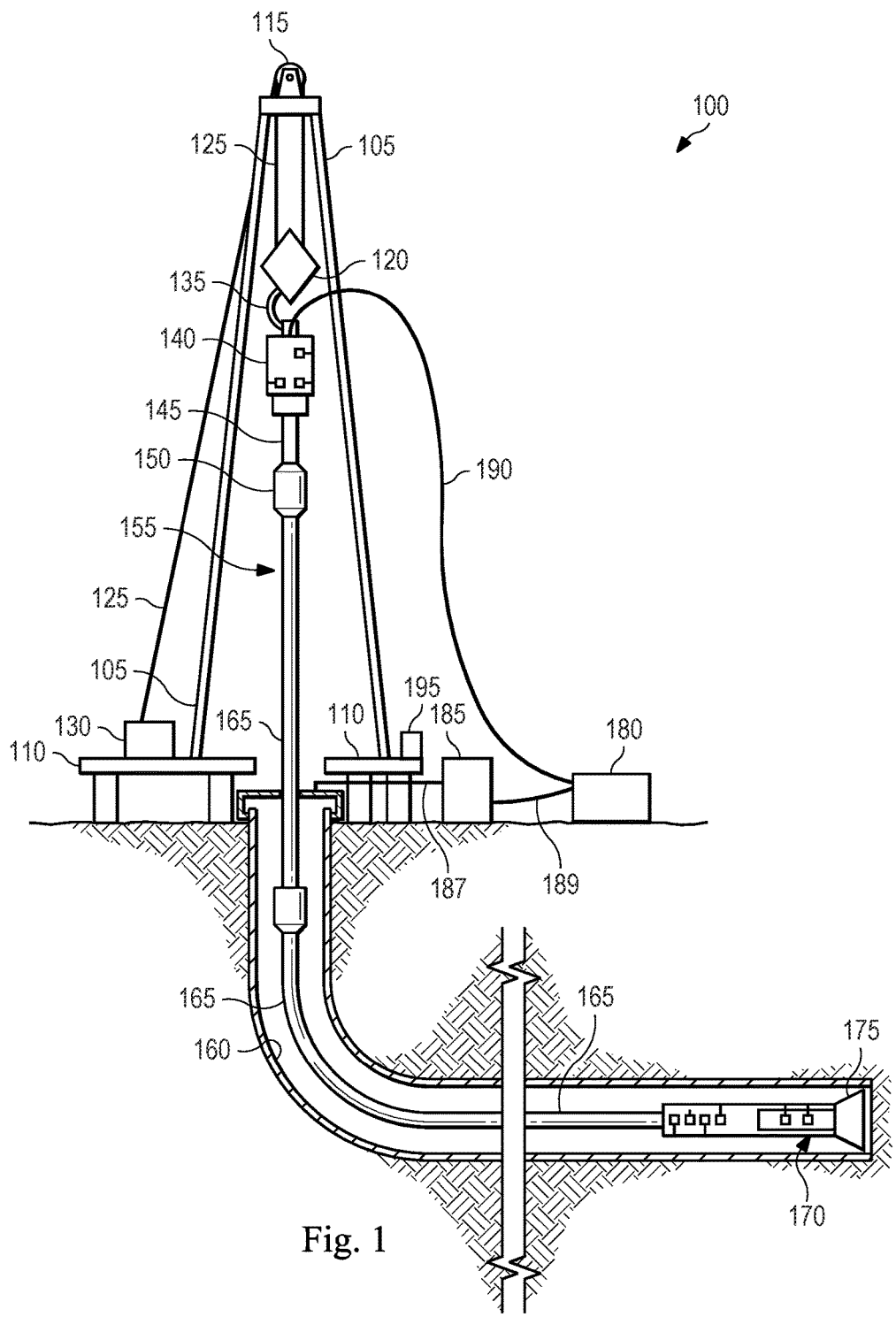
FIG. 1 is a schematic of an apparatus shown as an exemplary drilling rig according to one or more aspects of the present disclosure.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of the present disclosure include a drilling rig apparatus that includes a control system that mitigates stick-slip vibrations more quickly than current solutions available, and therefore is capable of dealing with higher harmonics than currently possible.

In some implementations, a controller of a top drive is set to a torque control mode instead of a speed control mode. Typically, a speed control mode is slower to complete relative to a torque control mode (e.g., 5 milliseconds for a speed control mode compared to less than 1 millisecond or so for a torque control mode). Thus, in torque control mode, the controller may perform torque control loops. Actual torque measurements are received from a torque sensor (whether directly measured or derived from another metric such as current to the motor of the top drive). The controller compares the actual torque measurement, which identifies any torsional waves corresponding to potential stick-slip occurrence, to a target torque value identified in a torque command from a slow integration speed control loop. The controller identifies the difference from the comparison and accelerates/decelerates the motor of the top drive to maintain the desired torque.

In the slow integration speed control loop, which may, in some implementations, be at least an order of magnitude lower in response than the torque control loop (e.g., on the order of seconds compared to milliseconds for the torque control loop), a desired RPM set point is received either previously or dynamically at a user interface. The controller implementing the slow integration speed control loop may be a different controller than that being set to, and implementing, the torque control loop. The slow integration speed control loop operates concurrent to the torque control loop, albeit at a slower pace. The slow integration speed control loop compares the desired RPM set point to an actual RPM measurement received from an RPM sensor (e.g., an encoder at the motor of the top drive). The loop generates a torque command including a target torque value based on the difference between the actual RPM measurement and the desired RPM set point, which is sent to the torque control loop to slowly implement in order to arrive at the desired RPM set point over time.

The slow integration speed control loop may include, or operate in cooperation with, a speed limiter that identifies an acceptable bound (i.e., speed limit) for operation of the motor of the top drive. The speed limiter may limit either a difference speed value to the speed limit, or the target torque value to the speed limit, depending on the units in which the speed limit is expressed. Alternatively or in addition, the torque control loop may include or operate in cooperation with the speed limiter (i.e., the speed limiter may operate with the torque control loop instead of the slow integration speed control loop, or the speed limiter may be implemented with both loops). For example, the speed limiter may limit a current adjustment command output by the torque control loop to a value that will limit the acceleration (or deceleration) of the motor on the top drive to acceptable bounds, either on its own or in combination with limiting as desired in the slow integration speed control loop. In this manner, the top drive speed may be maintained so that it does not go out of an acceptable bound.

In some implementations, the top drive may be a direct drive top drive that does not have the same gearing as traditional top drives. Thus, the high inertia sensed at a quill in a system that uses a traditional top drive with gearing is avoided. This may be useful so that the inertia at the top drive is on par (e.g., approximately matches or may be assumed to match) the inertia down-hole at a bottom hole assembly. Accordingly, embodiments of the present disclosure provide a quicker response to stick-slip conditions, enabling response to higher frequency torsional vibrations on the drill string attached to the top drive (higher harmonics), increased down-hole tool life (e.g., better drilling bit life, less unintended strain/wear on other parts of the BHA), and fewer trips due to better wear of down-hole components.

FIG. 1 is a schematic of a side view of an exemplary drilling rig 100 according to one or more aspects of the present disclosure. In some examples, the drilling rig 100 may form a part of a land-based, mobile drilling rig. However, one or more aspects of the present disclosure are applicable or readily adaptable to any type of drilling rig with supporting drilling elements, for example, the rig may include any of jack-up rigs, semisubmersibles, drill ships, coil tubing rigs, well service rigs adapted for drilling and/or re-entry operations, and casing drilling rigs, among others within the scope of the present disclosure.

The drilling rig 100 includes a mast 105 supporting lifting gear above a rig floor 110. The lifting gear may include a crown block 115 and a traveling block 120. The crown block 115 is coupled at or near the top of the mast 105, and the traveling block 120 hangs from the crown block 115 by a drilling line 125. One end of the drilling line 125 extends from the lifting gear to axial drive 130. In some implementations, axial drive 130 is a drawworks, which is configured to reel out and reel in the drilling line 125 to cause the traveling block 120 to be lowered and raised relative to the rig floor 110 (i.e., parallel to a vertical axis of the drilling rig 100, and hence reference to it as an "axial drive"). The other end of the drilling line 125, known as a dead line anchor, is anchored to a fixed position, possibly near the axial drive 130 or elsewhere on the rig. Other types of hoisting/lowering mechanisms may be used as axial drive 130 (e.g., rack and pinion traveling blocks as just one example), though in the following reference will be made to drawworks 130 for ease of illustration.

A hook 135 is attached to the bottom of the traveling block 120. A drill string rotary device 140, of which a top drive is an example, is suspended from the hook 135. The drill string rotary device 140 may be, for example, a direct drive top drive, while in other embodiments it may be a top drive with gearing. For example, where a top drive includes gearing, the inertia sensed at the top drive may differ from that down-hole due to gear ratios in the gearing. This is not an issue with direct drive top drives, as they do not include the gearing of traditional top drives. Thus, direct drive top drives will exhibit a sensed inertia that is on par with, or approximately the same as, the inertia of the BHA 170 down-hole. As a result, the torque on the drill string 155 pipe at the connecting point to the top drive 140 may be approximately the same as the torque sensed at the top drive 140. Reference will be made herein simply to top drive 140 for simplicity of discussion.

A quill 145 extending from the top drive 140 is attached to a saver sub 150, which is attached to a drill string 155 suspended within a wellbore 160. Alternatively, the quill 145 may be attached to the drill string 155 directly. The term "quill" as used herein is not limited to a component which directly extends from the top drive 140, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, for the sake of clarity and conciseness, these components may be collectively referred to herein as the "quill." It should be understood that other techniques for arranging a rig may not require a drilling line, and are included in the scope of this disclosure.

The drill string 155 includes interconnected sections of drill pipe 165, a bottom hole assembly (BHA) 170, and a drill bit 175. The BHA 170 may include stabilizers, drill collars, and/or measurement-while-drilling (MWD) or wireline conveyed instruments, among other components. The drill bit 175 is connected to the bottom of the BHA 170 or is otherwise attached to the drill string 155. In the exemplary embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

A mud pump system 180 receives the drilling fluid, or mud, from a mud tank assembly 185 and delivers the mud to the drill string 155 through a hose or other conduit 190, which may be fluidically and/or actually connected to the top drive 140. In some implementations, the mud may have a density of at least 9 pounds per gallon. As more mud is pushed through the drill string 155, the mud flows through the drill bit 175 and fills the annulus that is formed between the drill string 155 and the inside of the wellbore 160, and is pushed to the surface. At the surface the mud tank assembly 185 recovers the mud from the annulus via a conduit 187 and separates out the cuttings. The mud tank assembly 185 may include a boiler, a mud mixer, a mud elevator, and mud storage tanks. After cleaning the mud, the mud is transferred from the mud tank assembly 185 to the mud pump system 180 via a conduit 189 or plurality of conduits 189. When the circulation of the mud is no longer needed, the mud pump system 180 may be removed from the drill site and transferred to another drill site.

The drilling rig 100 also includes a control system 195 configured to control or assist in the control of one or more components of the drilling rig 100. For example, the control system 195 may be configured to transmit operational control signals to the drawworks 130, the top drive 140, the BHA 170 and/or the mud pump system 180. The control system 195 may be a stand-alone component installed somewhere on or near the drilling rig 100, e.g. near the mast 105 and/or other components of the drilling rig 100, or on the rig floor to name just a few examples. In some embodiments, the control system 195 is physically displaced at a location separate and apart from the drilling rig, such as in a trailer in communication with the rest of the drilling rig. As used herein, terms such as "drilling rig" or "drilling rig apparatus" may include the control system 195 whether located at or remote from the remainder of the drilling rig.

According to embodiments of the present disclosure, the control system 195 may be a stick-slip mitigation control system or include the stick-slip mitigation control system (e.g., among other control systems of the drilling rig 100). The control system 195 may obtain multiple drilling parameters including torque (measured or derived) and rotations per minute (RPM) at the interface of the top drive 140 to the drill string 155 (i.e., both measurements may be at or near the surface). The control system 195 may include a slow integration speed control loop (e.g., a control loop that operates over a longer period of time than other control loops, such as on the order of seconds) as well as both a speed control loop (e.g., a shorter loop than the slow integration speed control loop, such as on the order of 5 milliseconds) and a torque control loop (e.g., that is shorter than both other loops, such as on the order of less than 1 millisecond).

In embodiments where the speed control loop is included, the control system 195 may be set to the torque control loop instead of the speed control loop, such that commands from the slow integration speed control loop are provided directly to the torque control loop instead of the speed control loop. As a result, embodiments of the present disclosure provide a quicker response to stick-slip conditions, enabling response to higher frequency torsional vibrations on the drill string 155 (higher harmonics), increased down-hole tool life (e.g., better drilling bit life, less unintended strain/wear on other parts of the BHA 170), and fewer trips due to better wear of down-hole components.

Figure 2A:
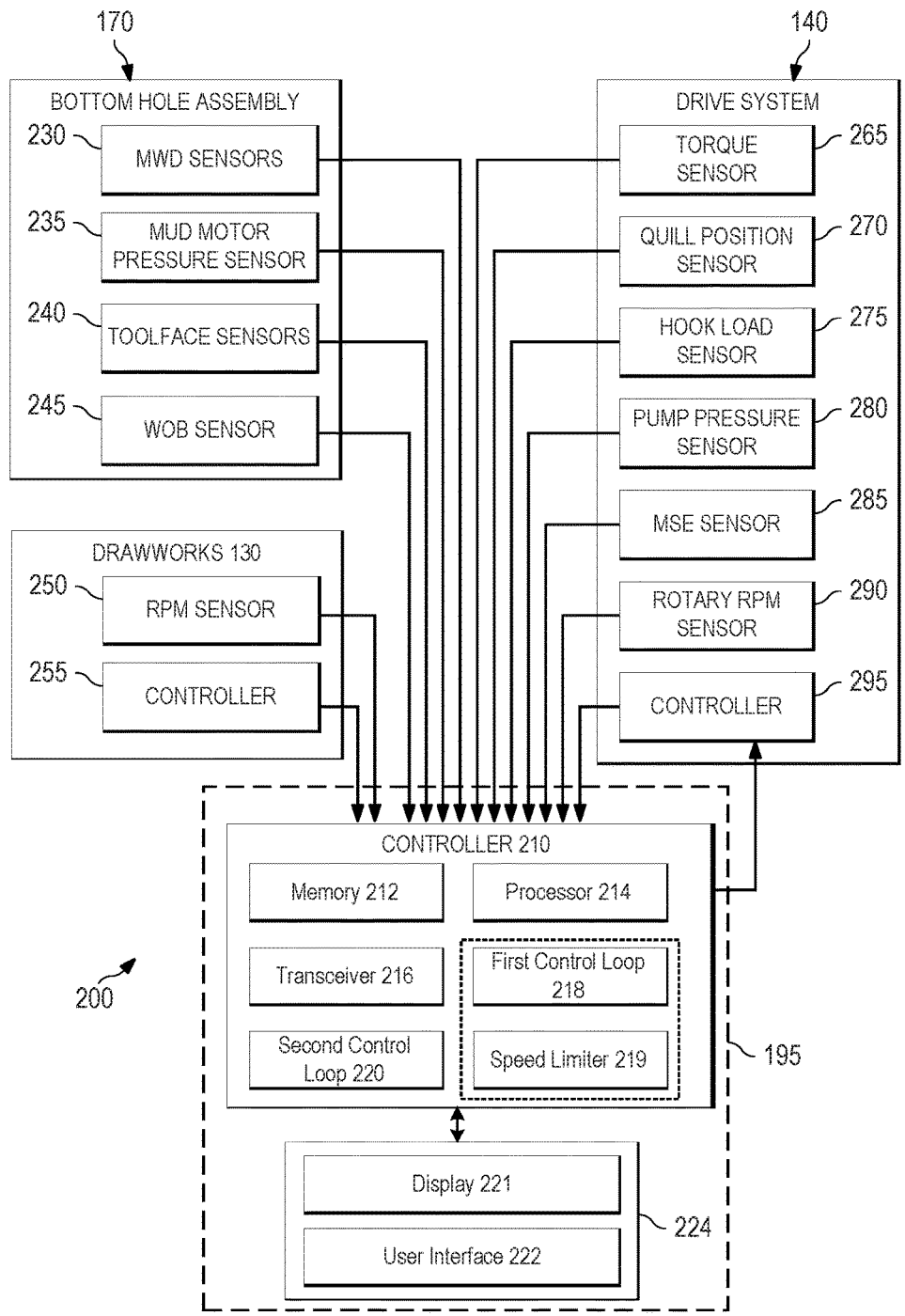
FIG. 2A is a block diagram of an apparatus shown as an exemplary control system according to one or more aspects of the present disclosure.

Turning to FIG. 2A, a block diagram of an exemplary stick-slip mitigation control system configuration 200 according to one or more aspects of the present disclosure is illustrated. In some implementations, the control system configuration 200 may be described with respect to the drawworks 130, top drive 140, BHA 170, and control system 195. The control system configuration 200 may be implemented within the environment and/or the apparatus shown in FIG. 1.

The control system 195 includes a controller 210 and an interface system 224. Depending on the embodiment, these may be discrete components that are interconnected via wired and/or wireless means. Alternatively, the interface system 224 and the controller 210 may be integral components of a single system.

The controller 210 includes a memory 212, a processor 214, a transceiver 216, a first control loop 218, speed limiter 219, and a second control loop 220. As discussed further below, the first control loop 218 may be the slow integration speed control loop 218 and the second control loop may be the torque control loop 220 (as noted above, a faster speed control loop may also be included although the torque control loop may be selected to be used herein). The memory 212 may include a cache memory (e.g., a cache memory of the processor 214), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 212 may include a non-transitory computer-readable medium.

The memory 212 may store instructions. The instructions may include instructions that, when executed by the processor 214, cause the processor 214 to perform operations described herein with reference to the controller 210 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 214 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the controller 210 introduced in FIG. 1 above. The processor 214 may also be implemented as a combination of computing devices, e.g., a combination of a DSP and a microprocessor, a plurality of microprocessors, one or more microprocessors in conjunction with a DSP core, or any other such configuration. The transceiver 216 may include a local area network (LAN), wide area network (WAN), Internet, satellite-link, and/or radio interface to communicate bi-directionally with other devices, such as the top drive 140, drawworks 130, BHA 170, and other networked elements.

The control system 195 also includes an interface system 224. The interface system 224 includes a display 221 and a user interface 222. The interface system 224 also includes a memory and a processor as described above with respect to controller 210. In some implementations, the interface system 224 is separate from the controller 210, while in another embodiment the interface system 224 is part of the controller 210.

The display 221 may be used for visually presenting information to the user in textual, graphic, or video form. The display 221 may also be utilized by the user to input drilling parameters, limits, or set point data in conjunction with the input mechanism of the user interface 222, such as a set point for a desired RPM of the drill string 155. The set point for the RPM may be received before drilling begins and may be updated dynamically during drilling operations. For example, the input mechanism may be integral to or otherwise communicably coupled with the display 221. The input mechanism of the user interface 222 may also be used to input additional settings or parameters.

The input mechanism of the user interface 222 may include a keypad, voice-recognition apparatus, dial, button, switch, slide selector, toggle, joystick, mouse, data base and/or other conventional or future-developed data input device. Such a user interface may support data input from local and/or remote locations. Alternatively, or additionally, the user interface may permit user-selection of predetermined profiles, algorithms, set point values or ranges, and well plan profiles/data, such as via one or more drop-down menus. The data may also or alternatively be selected by the controller 210 via the execution of one or more database look-up procedures. In general, the user interface 222 and/or other components within the scope of the present disclosure support operation and/or monitoring from stations on the rig site as well as one or more remote locations with a communications link to the system, network, LAN, WAN, Internet, satellite-link, and/or radio, among other means.

The top drive 140 includes one or more sensors or detectors. The top drive 140 includes a rotary torque sensor 265 (also referred to herein as a torque sensor 265) that is configured to detect a value or range of the reactive torsion of the quill 145 or drill string 155. For example, the torque sensor 265 may be a torque sub physically located between the top drive 140 and the drill string 155. As another example, the torque sensor 265 may additionally or alternative be configured to detect a value or range of torque output by the top drive 140 (or commanded to be output by the top drive 140), and derive the torque at the drill string 155 based on that measurement. Detected voltage and/or current may be used to derive the torque at the interface of the drill string 155 and the top drive 140. The controller 295 is used to control the rotational position, speed and direction of the quill 145 or other drill string component coupled to the top drive 140 (such as the quill 145 shown in FIG. 1), shown in FIG. 2A. The torque data may be sent via electronic signal or other signal to the controller 210 via wired and/or wireless transmission (e.g., to the transceiver 216).

The top drive 140 may also include a quill position sensor 270 that is configured to detect a value or range of the rotational position of the quill, such as relative to true north or another stationary reference. The top drive 140 may also include a hook load sensor 275 (e.g., that detects the load on the hook 135 as it suspends the top drive 140 and the drill string 155), a pump pressure sensor or gauge 280 (e.g., that detects the pressure of the pump providing mud or otherwise powering the down-hole motor in the BHA 170 from the surface), a mechanical specific energy (MSE) sensor 285 (e.g., that detects the MSE representing the amount of energy required per unit volume of drilled rock, whether directly sensed or calculated based on sensed data), and a rotary RPM sensor 290. The rotary RPM sensor 290 is configured to detect the rotary RPM of the drill string 155. This may be measured at the top drive or elsewhere, such as at surface portion of the drill string 155 (e.g., reading an encoder on the motor of the top drive 140). These signals, including the RPM detected by the RPM sensor 290, may be sent via electronic signal or other signal to the controller 210 via wired and/or wireless transmission.

The drawworks 130 may include one or more sensors or detectors that provide information to the controller 210. The drawworks 130 may include an RPM sensor 250. The RPM sensor 250 is configured to detect the rotary RPM of the drilling line 125, which corresponds to the speed of hoisting/lowering of the drill string 155. This may be measured at the drawworks 130. The RPM detected by the RPM sensor 250 may be sent via electronic signal or other signal to the controller 210 via wired or wireless transmission. The drawworks 130 may also include a controller 255. The controller 255 is used to control the speed at which the drawstring is hoisted or lowered.

In addition to the top drive 140 and drawworks 130, the BHA 170 may include one or more sensors, typically a plurality of sensors, located and configured about the BHA 170 to detect parameters relating to the drilling environment, the BHA 170 condition and orientation, and other information. These may provide information that may be considered by the controller 210 when it adjusts the RPM of the top drive 140.

In the embodiment shown in FIG. 2A, the BHA 170 includes MWD sensors 230. For example, the MWD sensor 230 may include a MWD casing pressure sensor that is configured to detect an annular pressure value or range at or near the MWD portion of the BHA 170, an MWD shock/vibration sensor that is configured to detect shock and/or vibration in the MWD portion of the BHA 170, and an MWD torque sensor that is configured to detect a value or range of values for torque applied to the bit by the motor(s) of the BHA 170. The MWD sensors 230 may also include an MWD RPM sensor that is configured to detect the RPM of the bit of the BHA 170. The data from these sensors may be sent via electronic signal or other signal to the controller 210 as well via wired and/or wireless transmission.

The BHA 170 may also include mud motor ΔP (differential pressure) sensor 235 that is configured to detect a pressure differential value or range across the mud motor of the BHA 170. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque. The BHA 170 may also include one or more toolface sensors 240, such as a magnetic toolface sensor and a gravity toolface sensor that are cooperatively configured to detect the current toolface orientation, such as relative to magnetic north. The gravity toolface may detect toolface orientation relative to the Earth's gravitational field. In an exemplary embodiment, the magnetic toolface sensor may detect the current toolface when the end of the wellbore is less than about 7° from vertical, and the gravity toolface sensor may detect the current toolface when the end of the wellbore is greater than about 7° from vertical. The BHA 170 may also include an MWD weight-on-bit (WOB) sensor 245 that is configured to detect a value or range of values for down-hole WOB at or near the BHA 170. The data from these sensors may be sent via electronic signal or other signal to the controller 210 via wired and/or wireless transmission.

Returning to the controller 210, the slow integration speed control loop 218 and the torque control loop 220 may be used for various aspects of the present disclosure. The slow integration speed control loop 218 may include various hardware components and/or software components to implement the aspects of the present disclosure. For example, in some implementations the slow integration speed control loop 218 may include instructions stored in the memory 212 that causes the processor 214 to perform the operations described herein. In an alternative embodiment, the slow integration speed control loop 218 is a hardware module that interacts with the other components of the controller 210 to perform the operations described herein.

As discussed above, the slow integration speed control loop 218 is used to bring the RPM of the top drive 140 to a set point RPM such as that entered via the interface system 224. For example, a user may enter a target RPM set point for the drill string 155 or select a pre-populated value displayed on the display 221. Further, the slow integration speed control loop 218 may receive the measured RPM of the drill string 155 from the rotary RPM sensor 290 as noted above. The slow integration speed control loop 218, which for example may be operated as part of a proportional-integral-derivative (PID) loop in a controller (e.g., a programmable logic controller (PLC), a Programmable Automation Controller (PAC), or an embedded controller in a variable frequency drive), may compare the set point RPM and the measured RPM and generate a difference signal. For example, the measured RPM may be subtracted from the set point RPM. The slow integration speed control loop 218 may take the difference signal (representing a difference between set point and actual RPM of the top drive 140 for the drill string 155) and generate a torque command that will be used by the second control loop 220 to slowly modify the RPM of the top drive 140 to the target RPM set point.

In some implementations, the speed of the slow integration speed control loop 218 may be at least an order of magnitude greater in response time than that of the torque control loop described below as second control loop 220. For example, the slow integration speed control loop 218 may have a speed of response of 10 seconds to converge to a target set point RPM. Thus, the torque control loop 220 may slowly use the torque command from the slow integration speed control loop 218 to adjust the RPM of the top drive 140 to the set point RPM, while the torque control loop 220 also responds to variations in torsional waves indicated by the torque sensor 265.

The speed limiter 219 may be integrated within the slow integration speed control loop 218 or be separate therefore, as illustrated in FIG. 2A with dashed lines. Either way, the speed limiter 219 has access to the set point RPM (e.g., as set by a driller), as well as speed feedback of the measured RPM. The measured RPM may be provided from the controller (e.g., the VFD) or directly from one or more encoders. In use, the speed limiter 219 may monitor the slow integration speed control loop 218, whether the inputs or outputs thereto, or some combination thereof, and make adjustments where appropriate to ensure that any resulting speed for the motor of the top drive 140 according to embodiments of the present disclosure will not exceed an acceptable speed bound (e.g., to avoid allowing the torque control loop 220 from causing acceleration (or deceleration) beyond an acceptable bound).

For example, the speed limiter 219 may maintain a speed limit identifying the acceptable bound. The speed limiter 219 may compare the difference signal from the slow integration speed control loop 218 to the speed limit. If the difference signal is less than the speed limit, then no change may be made, while if the difference signal is greater than the speed limit, then it may be bounded to the speed limit. Alternatively, the speed limit may be stored as a torque value instead of a speed value, in which case the speed limiter 219 may compare the generated torque command to the speed limit (expressed as a torque value) and operate accordingly as described already, depending on the result of the comparison. Thus, the top drive 140 may be prevented from exceeding an acceptable bound, and therefore protected from damage.

Although illustrated as separate from the slow integration speed control loop 218, this may be implemented as part of the loop itself or may be separately performed as noted. Further, the speed limit maintained by the speed limiter 219 may be statically set depending upon the characteristics of the top drive 140, or may be dynamically changed depending upon the life cycle or other maintenance concerns of the top drive 140, or based upon other factors and decisions by the operator. Further, although illustrated as separate from the torque control loop 220, the speed limiter 219 may alternatively operate to limit the current adjustment command output thereby to a value that will limit the acceleration (or deceleration) of the motor on the top drive 140 to acceptable bounds as statically or dynamically set as noted above, whether alone or in combination with also operating as part of the slow integration speed control loop 218.

The torque control loop 220 is used to accelerate or decelerate the motor on the top drive 140 by adjusting motor current and motor flux to maintain the torque set point of the top drive 140. The torque control loop 220 may be operated as part of a variable frequency drive; in the example illustrated in FIG. 2A, the slow integration speed control loop 218 and the torque control loop 220 may be housed as part of the same controller 210. As noted above, where there is also another speed control loop available (that is shorter than the slow integration speed control loop 218), the controller 210 is set to operate in torque control mode instead of speed control mode, and therefore the torque command provided from the slow integration speed control loop 218 bypasses the speed control loop and instead is provided directly to the torque control loop 220.

The torque control loop 220 receives the torque command from the slow integration speed control loop 218 in addition to the measured torque data from the torque sensor 265 or estimated torque from a measurement of current. The torque control loop 220 may compare the torque command (which may include a target torque amount or a change amount to arrive at a target torque amount) and the measured torque and generate another difference signal. For example, the measured torque may be subtracted from the torque identified in the torque command from the slow integration speed control loop 218. The torque control loop 220 may utilize the different signal (otherwise referred to as a torque demand, the result of the error between the set point of the torque command and the measured/estimated torque) to accelerate or decelerate the top drive 140. For example, the torque control loop 220 may take the difference signal (representing a difference between target and actual torque on the drill string 155 interface to the top drive 140) and generate a current adjustment command that is output to the controller 295 illustrated in FIG. 2A. In this manner, embodiments of the present disclosure mitigate stick-slip vibrations as they reach the top drive 140, while slowly bringing the RPM of the top drive 140 to the set point RPM.

For example, the torque control loop 220 may receive a torque command from the slow integration speed control loop 218 that indicates that the RPM of the top drive 140 is below the set point RPM, while a torque measurement from the torque sensor 265 indicates that the BHA 170 is slowing. In response, the torque control loop 220 generates a current adjustment command that directs the top drive 140 to accelerate the RPM in order to maintain torque in the drill string 155 (e.g., at the quill 145) so that the top drive 140 does not reflect a torque wave back down the drill string 155. In similar manner, if the torque measurement indicates that the BHA 170 may be speeding up, the torque control loop 220 generates a current adjustment command that directs the top drive 140 to decelerate the RPM in order to maintain torque in the drill string 155 (e.g., at the quill 145) so as to absorb at least some of the torsional wave reaching the top drive 140 (instead of reflecting it back down the drill string 155).

The current adjustment command may be, for example, a pulse width modulation signal where the controller 210 includes a variable frequency drive. In some implementations, the speed of the torque control loop 220 may be at least an order of magnitude smaller than that of the slow integration speed control loop 218. For example, the torque control loop 220 may generate a current adjustment command for the top drive 140 approximately every 1 millisecond (which is faster than a speed control loop), though other speeds are possible as will be recognized while remaining faster (and thus more responsive) than use of a speed control loop as well.

In view of the use of the faster torque control loop 220, embodiments of the present disclosure provide a quicker response to stick-slip conditions, enabling response to higher frequency torsional vibrations on the drill string 155 (higher harmonics), increased down-hole tool life (e.g., better drilling bit life, less unintended strain/wear on other parts of the BHA 170), and fewer trips due to better wear of down-hole components.

FIG. 2A illustrates the slow integration speed control loop 218 and torque control loop 220 as being included as part of the same controller 210 in the control system 195. Alternatively, each loop may be implemented by a different controller. An example of this is provided in FIG. 2B, which is a block diagram of an exemplary stick-slip mitigation control system configuration 201 according to one or more aspects of the present disclosure. In some implementations, the control system configuration 201 may be described with respect to the drawworks 130, top drive 140, BHA 170, and control system 195 in similar manner as in FIG. 2A. The control system configuration 201 may be implemented within the environment and/or the apparatus shown in FIG. 1. This discussion, as well as FIG. 2B itself, focuses on those aspects that differ from the elements introduced above in FIG. 2A (e.g., FIG. 2B may also include as inputs values from the sensors discussed for FIG. 2A).

As illustrated, the first control loop 218, the slow integration speed control loop 218, is implemented in controller 210.*a*. In some implementations, the controller 210.*a* may be PID, PI, or P controller. The controller 210.*a* includes the memory 212.*a*, processor 214.*a*, and transceiver 216.*a* and may be described according to the information detailed above with respect to memory 212, processor 214, and transceiver 216. The slow integration speed control loop 218 in FIG. 2B may operate as described with respect to FIG. 2A above—for example, it may receive as input a measured RPM of the drill string 155 from the rotary RPM sensor 290, as well as a set point RPM that may be entered at the interface system 224.

Figure 2B:
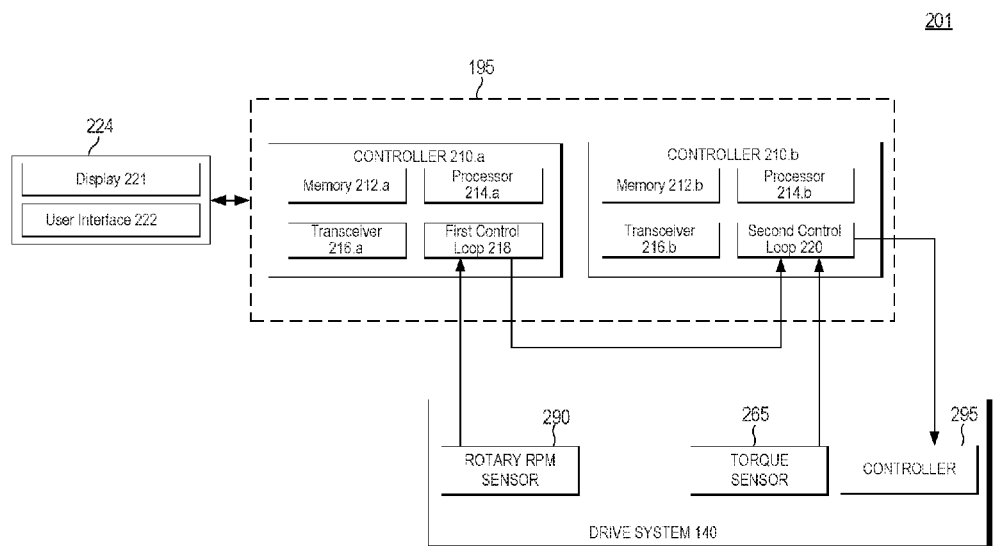
FIG. 2B is a block diagram of an apparatus shown as an exemplary control system according to one or more aspects of the present disclosure.

The output from the slow integration speed control loop 218 (e.g., the torque command) may be output to the torque control loop 220. As illustrated in FIG. 2B, the torque control loop 220 is implemented in controller 210.*b*. Controller 210.*b* may be, for example, a variable frequency drive. The controller 210.*b* may include a memory 212.*b*, a processor 214.*b*, and a transceiver 216.*b* that may be described in similar manner as with respect to memory 212, processor 214, and transceiver 216. The torque control loop 220 in FIG. 2B may operate as described above with respect to FIG. 2A—for example, it may receive as an input the measured torque from the torque sensor 265 as well as the torque command from the slow integration speed control loop 218, and output a current adjustment command. As illustrated, the current adjustment command may be output to the controller 295 of the top drive 140 for implementation by the motor of the top drive 140.

The controller 210.*a* and the controller 210.*b* may be housed together in the same cabinet, whether on the drilling rig 100 (e.g., in the drilling floor, driller's cabin, etc.), on a mast, or in a trailer removed at some distance from the drilling rig 100. Alternatively, the controller 210.*a* may be located at a further distance from controller 210.*b*, e.g. the controller 210.*b* may be located close to the top drive 140 or elsewhere at the drilling rig 100 while the controller 210.*a* may be located further away in a trailer or elsewhere, or vice versa. As the operations from controller 210.*a* and 210.*b* are coordinated and rely on each other to perform stick-slip mitigation according to embodiments of the present disclosure, they are illustrated as conceptually being part of the same control system 195 whether they are physically proximate or remote from each other.

Figure 3:
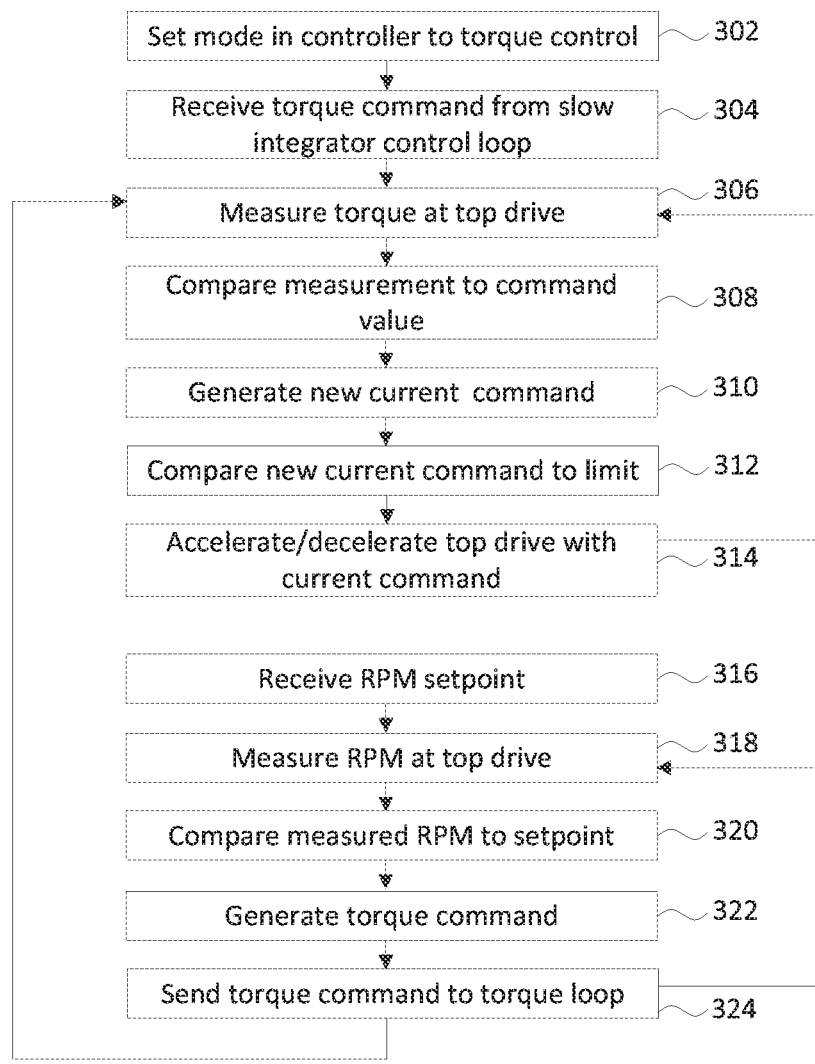
FIG. 3 is a flow chart showing an exemplary process for optimizing stick-slip mitigation according to aspects of the present disclosure.

Turning now to FIG. 3, an exemplary flow chart showing an exemplary method 300 for optimizing stick-slip mitigation according to aspects of the present disclosure is illustrated. The method 300 may be performed, for example, with respect to the control system 195 and the drilling rig 100 components discussed above with respect to FIGS. 1, 2A, and 2B. For purposes of discussion, reference in FIG. 3 will be made to controller 210 of FIG. 2A, though it will be recognized that the same may be achieved by the controllers 210.*a*/210.*b* of control system 195 of FIG. 2B. It is understood that additional steps can be provided before, during, and after the steps of method 300, and that some of the steps described can be replaced or eliminated from the method 300.

At block 302, the controller 210 is set to be in torque control mode instead of speed control mode (the speed control mode being different from the slow integration speed control 218 identified above), where the controller 210 includes both the speed control and torque control modes. This may be set, for example, by a user selection at the interface system 224.

At block 304, the torque control loop 220 of the controller 210 receives a torque command from the slow integration speed control loop 218, for example as described above and further below from block 322. The torque command may include a target torque value for the top drive 140 to have. The slow integration speed control loop 218 may be slower in looping than the torque control loop 220 (e.g., by an order of magnitude). Thus, the torque control loop 220 may complete multiple loops before a new torque command is output from the slow integration speed control loop 218. The torque command previously output from the slow integration speed control loop 218 may be latched in either loop so that it is retained until the next torque command is output.

At block 306, torque at the top drive 140 is measured by a torque sensor 265. For example, the torque sensor 265 may make a torque measurement on the drill string 155 near where it joins with the top drive 140 (e.g., where it is a torque sub located between the top drive 140 and the drill string 155). As another example, the torque sensor 265 may sense the amount of current provided from the controller 210 (e.g., a variable frequency drive) and derive the torque measurement based on the current amount.

At block 308, the controller 210 compares the measured torque with the torque value included in the torque command received from the slow integration speed control loop 218.

At block 310, the controller 210 utilizes the result of the comparison at block 308 (e.g., an error signal showing the difference between the values) to determine how much to accelerate or decelerate the motor of the top drive 140 so as to maintain the desired target torque value. The acceleration or deceleration may include a change in a pulse width modulation of the signal where the top drive 140's motor is an AC motor. This may also be referred to herein (the acceleration/deceleration) as the current adjustment command—i.e., the deceleration or acceleration may be obtained by generating a current adjustment command that is implemented by the motor of the top drive 140.

At block 312, the controller 210 compares the current adjustment command generated from block 310 to the speed limit (or limits, where multiple limits are maintained) for the motor on the top drive 140. For example, the speed limit may be maintained in the form of a current value, beyond which the current should not exceed to the top drive 140. Thus, if the current adjustment command from block 310 is greater than the speed limit, it may be bounded to the speed limit before implementation at block 314. Although block 312 is illustrated as part of the torque control loop 220, as noted with respect to FIG. 2A above this may alternatively be implemented as part of the slow integration speed control loop 218, e.g. after blocks 320 or 322 (or implemented in both).

At block 314, the controller 210 sends the current adjustment command generated at block 310 to the top drive 140, as potentially modified according to the speed limit block implemented at block 312. The speed at the top drive 140 changes according to the change in value of the current determined at block 310, whereby the motor of the top drive 140 accelerates or decelerates in accordance with the change in current output by the controller 210. For example, where the measured torque indicates that a stick event is imminent at the BHA 170, the output of the torque control loop comprising blocks 304 to 314 herein (the current adjustment command) causes the motor to decrease its RPM in order to maintain torque so as to avoid sticking. As another example, where the measured torque indicates that a slip event is imminent at the BHA 170, the output of the torque control loop causes the motor to increase its RPM in order to maintain torque in the drill string 155 to absorb some of the torsional wave traveling the drill string 155.

At any point during this process, one or more torque or current control tuning values (e.g., PID values) may be controlled to adjust the impact that the torque control has on RPM changes (which may otherwise be referred to as controlling the "aggressiveness" of the stick slip mitigation). For example, if one or more gains for the PID values are notably high, then more RPM fluctuations may occur beyond a desired amount and/or magnitude, in response to torque waves sensed in the drill string 155. An operator of the system, e.g. a driller, may input a change to the aggressiveness of the system, which may be translated to one or more changes to one or more gains for the PID values, so as to further control the responsiveness of the loops to events on the drill string 155.

Blocks 316 through 324 describe the slow integration speed control loop 218, which may operate generally concurrent to the torque control loop 220 (i.e., blocks 302-314). As noted above, the slow integration speed control loop 218 operates over a longer period of time than the speed and torque control loops, such as on the order of seconds. For example, the slow integration speed control loop 218 may operate over a period of seconds in response time, while the speed control loop may operate over a period of several milliseconds and the torque control loop 220 operates over a period of around one millisecond (to name an example).

At block 316, the controller 210 receives an RPM set point that identifies a set point RPM of the drill string 155. The set point for the RPM may be received before drilling from the interface system 224 begins and may be updated dynamically during drilling operations, such as through the interface system 224.

At block 318, the RPM of the top drive 140 is measured by the rotary RPM sensor 290. For example, the rotary RPM sensor 290 detects the RPM of the drill string 155 at the top drive or elsewhere, such as at surface portion of the drill string 155 (e.g., reading an encoder on the motor of the top drive 140).

At block 320, the controller 210 compares the measured RPM at block 318 to the set point RPM received/maintained at block 316. The result is processed through a loop, such as a PID loop, to generate the new torque command.

At block 322, the controller 210 takes the result of the comparison at block 320 and, for example through the PID loop, generates the new torque command. This new torque command identifies how the top drive 140 should slowly modify the torque of the top drive 140 to achieve an RPM of the top drive 140 equal to the target RPM set point received at block 316. The torque command may include an incremental change value to the existing torque at the motor of the top drive 140, or alternatively a replacement torque command that supplants the existing torque command controlling the motor at the top drive 140. As noted above, the controller 210, in the torque control loop 220, takes this torque command into account as well as existing torque conditions on the drill string 155 in order to mitigate stick-slip vibrations.

At block 324, the slow integration speed control loop 218 at the controller 210 sends the new torque command generated at block 322 to block 304 of the torque control loop 220 in order to slowly bring the actual RPM of the top drive 140 to the target RPM set point, while absorbing at least some of the torsional waves that reach the top drive 140 on the drill string 155 to mitigate stick-slip vibrations, such that on average the target set point RPM is seen at the top drive 140 over time.

Figure 4:
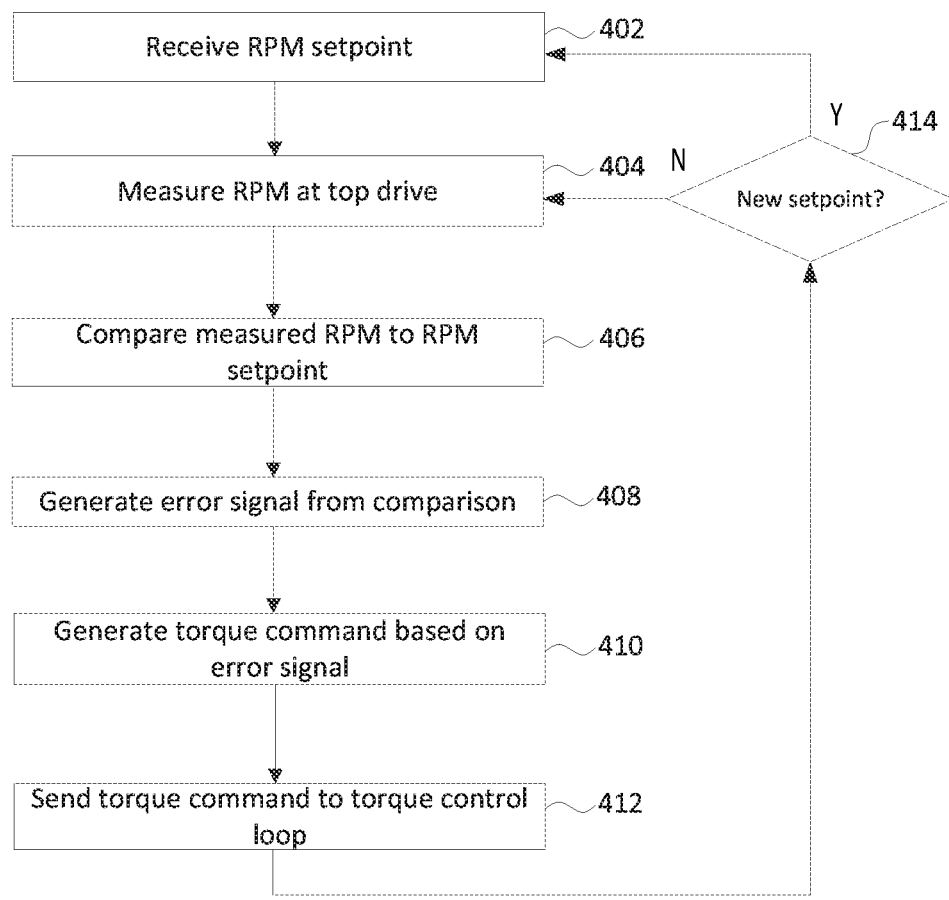
FIG. 4 is a flow chart showing an exemplary process for optimizing stick-slip mitigation according to aspects of the present disclosure.

FIG. 4 illustrates an exemplary flow chart showing an exemplary method 400 for optimizing stick-slip mitigation according to aspects of the present disclosure is illustrated. The method 400 may be performed, for example, with respect to the control system 195 and the drilling rig 100 components discussed above with respect to FIGS. 1, 2A, and 2B, particularly with respect to the slow integration speed control loop 218. For purposes of discussion, reference in FIG. 4 will be made to controller 210.a of FIG. 2B for the slow integration speed control loop 218, though it will be recognized that the same may be achieved by the controller 210 generally of control system 195 of FIG. 2A. As noted with respect to FIG. 2B, the controller 210.a may be in the form of a PLC implementing a PID loop to name just one example. It is understood that additional steps can be provided before, during, and after the steps of method 400, and that some of the steps described can be replaced or eliminated from the method 400.

At block 402, the controller 210.a receives an RPM set point, such as from the interface system 224 (or other source) at the transceiver 216.a. The set point for the RPM may be received before drilling from the interface system 224 begins and may be updated dynamically during drilling operations, such as through the interface system 224.

At block 404, the controller 210.a receives an RPM measurement from the rotary RPM sensor 290, which may be situated for example at the top drive 140's motor in the form of an encoder, such as discussed with respect to block 316.

At block 406, the controller 210.a compares the RPM measurement from the rotary RPM sensor 290 from block 404 to the RPM set point received at block 402, such as discussed with respect to block 318 above.

At block 408, the controller 210.a generates, as a result of this comparison from block 406 (e.g. a subtraction of the measured RPM value from the RPM set point value), an error signal.

At block 410, the controller 210.a generates the new torque command, such as through a PID loop as discussed with respect to block 320 of FIG. 3. Part of this generation involves the translation from the RPM error signal from block 406 to a torque value that identifies how the torque should be changed at the top drive 140 in order to achieve the RPM set point value and that may be used by the controller 210.b in the torque control loop 220.

The controller 210.a may compare, as part of the method 400, the new torque command against a speed limit (or, alternatively, an RPM value used to generate the torque command) to determine whether to limit to the bounds of the speed limit. As noted with respect to FIG. 3, this may alternatively occur as part of the method 500 in the torque control loop 220.

At block 412, the controller 210.a sends the new torque command generated at block 410 from the slow integration speed control loop 218 to the torque control loop 220 at the controller 210.b. This is done in order to slowly bring the actual RPM of the top drive 140 to the target RPM set point, while absorbing at least some of the torsional waves that reach the top drive 140 on the drill string 155 to mitigate stick-slip vibrations, such that on average the target set point RPM is seen at the top drive 140 over time.

The method 400 proceeds from block 412 to decision block 414. At decision block 414, if a new RPM set point has been received (e.g., because a driller/engineer or other entity has entered a change via the interface system 224), then the method 400 proceeds to block 402 as laid out above. If at decision block 414 a new RPM set point has not been received, then the method 400 of the slow integration speed control loop 218 proceeds to block 404 and as laid out above with the existing RPM set point value (e.g., as received previously at block 402).

Figure 5:
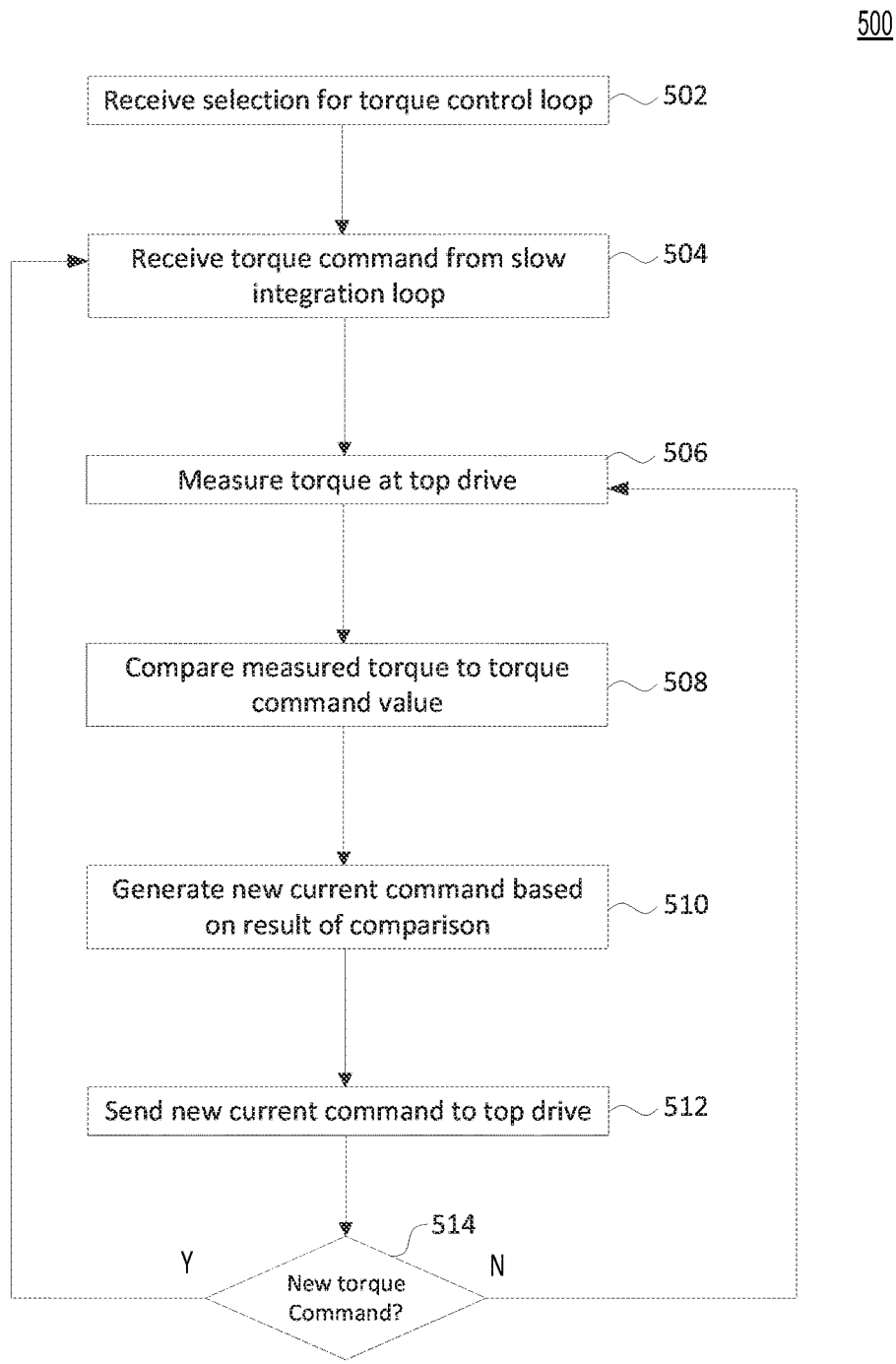
FIG. 5 is a flow chart showing an exemplary process for optimizing stick-slip mitigation according to aspects of the present disclosure.

FIG. 5 illustrates an exemplary flow chart showing an exemplary method 500 for optimizing stick-slip mitigation according to aspects of the present disclosure is illustrated. The method 500 may be performed, for example, with respect to the control system 195 and the drilling rig 100 components discussed above with respect to FIGS. 1-2B, particularly with respect to the torque control loop 220. For purposes of discussion, reference in FIG. 3 will be made to controller 210.b of FIG. 2B for the torque control loop 220, though it will be recognized that the same may be achieved by the controller 210 generally of control system 195 of FIG. 2A. As noted with respect to FIG. 2B, the controller 210.b may be in the form of a variable frequency drive to name just one example. It is understood that additional steps can be provided before, during, and after the steps of method 500, and that some of the steps described can be replaced or eliminated from the method 500.

At block 502, the controller 210.b is set to be in torque control mode instead of speed control mode (the speed control mode being different from the slow integration speed control 218 identified above), for example as discussed with respect to block 302 of FIG. 3. This may be set, for example, by a user selection at the interface system 224.

At block 504, the torque control loop 220 at the controller 210.b receives a new torque command from the slow integration speed control loop 218 at the controller 210.a, generated for example as discussed above with respect to FIG. 4.

At block 506, the controller 210.b receives a torque measurement from the torque sensor 265. For example, the torque sensor 265 may make a torque measurement on the drill string 155 near where it joins with the top drive 140 (e.g., where it is a torque sub located between the top drive 140 and the drill string 155). As another example, the torque sensor 265 may sense the amount of current provided from the controller 210 (e.g., a variable frequency drive) and derive the torque measurement based on the current amount (or provide the current value to the controller 210.b for the controller 210.b to derive the torque measurement from the measured current).

At block 508, the torque control loop 220 at the controller 210.b compares the torque measurement received at block 506 with the value of the torque command received at block 504 from the slow integration speed control loop 218 at the controller 210.a.

At block 510, the torque control loop 220 at the controller 210.b generates a new current adjustment command to accelerate or decelerate the motor of the top drive 140 based on the result of the comparison from block 508. For example, the current adjustment command may include a change in a pulse width modulation of the signal where the motor of the top drive 140 is an AC motor. In some implementations, the current adjustment command (i.e., the acceleration or deceleration rate change) may be an incremental change value to the existing current at the motor of the top drive 140 or alternatively a replacement current command that supplants the existing current command controlling the motor at the top drive 140.

The controller 210.b may compare, as part of the method 500, the current adjustment command against a speed limit to determine whether to limit to the bounds of the speed limit. As noted with respect to FIG. 3, this may alternatively occur as part of the method 400 in the slow integration speed control loop 218.

At block 512, the torque control loop 220 at the controller 210.b applies the new current adjustment command generated at block 510 to the top drive 140, for example to the motor (e.g., via the controller 295) of the top drive 140.

The method 500 proceeds to decision block 514. At decision block 514, if a new torque command is being received from the slow integration speed control loop 218 at the controller 210.a, then the method 500 returns to block 504 and proceeds as discussed above. The slow integration speed control loop 218 at the controller 210.a may be an order of magnitude slower in looping than the torque control loop 220 at the controller 210.b. Thus, the torque control loop 220 may complete multiple loops before a new torque command is received from the slow integration speed control loop 218.

If, at decision block 514, a new torque command is not being received from the slow integration speed control loop 218, the method 500 instead returns to block 506 to complete another torque control loop with the previously received, current torque command from the slow integration speed control loop 218. Thus, over time, the actual RPM at the top drive 140 may be slowly brought to the target RPM set point, all while absorbing at least some of the torsional waves that reach the top drive 140 on the drill string 155 to mitigate stick-slip vibrations.

Accordingly, embodiments of the present disclosure provide a quicker response to stick-slip conditions, enabling response to higher frequency torsional vibrations on the drill string 155 (higher harmonics), increased down-hole tool life (e.g., better drilling bit life, less unintended strain/wear on other parts of the BHA 170), and fewer trips due to better wear of down-hole components.

In view of the above and the figures, one of ordinary skill in the art will readily recognize that the present disclosure introduces a an apparatus comprising: a torque sensor configured to detect an amount of torque at a top drive coupled to a drill string of a drilling rig apparatus; and a controller configured to generate, in a slow integration control loop, a torque command in response to a difference between a measured rotations per minute (RPM) of the top drive and a target RPM; input the detected amount of torque from the torque sensor into a torque control loop; determine, in the torque control loop, a torque difference in response to a comparison between the torque command from the slow integration control loop and the detected amount of torque; and output, from the torque control loop, a current adjustment command based on the determined torque difference to the top drive for stick-slip vibration mitigation.

The apparatus may include wherein the torque sensor is configured to detect an amount of current by a motor of the top drive; and derive the amount of torque from the detected amount of current output. The apparatus may also include wherein the torque control loop comprises a first output time, the slow integration control loop comprises a second output time, and a speed control loop of the controller comprises a third output time, and the first output time is at least an order of magnitude less than the second output time and is shorter than the second and third output times. The apparatus may also include wherein the controller comprises a first controller and a second controller that are separate from each other, and the apparatus comprises a cabinet housing the first controller, the second controller, and the torque sensor. The apparatus may also include wherein the first controller comprises an external controller configured to implement the slow integration control loop, and the second controller comprises a variable frequency drive configured to implement the torque control loop. The apparatus may also include wherein the controller comprises a speed control loop and the torque control loop, and is set to operate in the torque control loop instead of the speed control loop for the stick-slip vibration mitigation, and the torque command from the slow integration control loop is provided directly to the torque control loop instead of the speed control loop. The apparatus may also include an RPM sensor configured to measure the RPM of the top drive, wherein the top drive comprises a direct drive, wherein the controller is further configured to compare the torque command to a speed limit; and limit, in response to the comparison, the torque command to a bound of the speed limit.

The present disclosure also includes a method, comprising: generating, by a controller, a torque command based on a difference between a detected rotations per minute (RPM) at a top drive coupled to a drill string of a drilling rig apparatus and a target RPM in a slow integration control loop; generating, by the controller, a current adjustment command based on a difference between a detected amount of torque at the top drive and the torque command in a torque control loop; and sending, from the controller, the current adjustment command to the top drive to accelerate or decelerate the top drive for stick-slip vibration mitigation.

The method may include detecting, by a torque sensor, the amount of torque at the top drive; and inputting the detected amount of torque from the torque sensor into the torque control loop. The method may also include wherein the detecting the amount of torque further comprises detecting, by the torque sensor, an amount of current output from the controller to the top drive; and deriving the amount of torque from the detected amount of current output. The method may also include detecting, by an RPM sensor, the RPM at the top drive, wherein the top drive comprises a direct drive; and inputting the detected RPM into the slow integration control loop. The method may also include completing, by the controller, the torque control loop in a first amount of time; and completing, by the controller, the slow integration control loop in a second amount of time, wherein the second amount of time is at least an order of magnitude greater than the first amount of time. The method may also include bypassing, by the controller, a speed control loop of the controller with the torque command from the slow integration control loop to the torque control loop. The method may also include wherein the controller comprises an external controller and a variable frequency drive housed in a cabinet together, the generating the torque command in the slow integration control loop comprises receiving, by the external controller, the detected RPM and determining the torque command, and the generating the current adjustment command in the torque control loop comprises receiving, by the variable frequency drive, the torque command and determining the current adjustment command.

The present disclosure also introduces a non-transitory machine-readable medium having stored thereon machine-readable instructions executable to cause a machine to perform operations comprising: generating a torque command based on a difference between a detected rotations per minute (RPM) at a top drive coupled to a drill string of a drilling rig apparatus and a target RPM in a slow integration control loop bounded by a speed limiter; inputting a detected amount of torque from a torque sensor at the top drive, and the torque command, into a torque control loop; generating a current adjustment command based on a difference between the detected amount of torque at the top drive and the torque command in the torque control loop; and sending the current adjustment command to the top drive for stick-slip vibration mitigation.

The non-transitory machine-readable medium may include completing the torque control loop in a first amount of time; and completing the slow integration control loop in a second amount of time, wherein the second amount of time is at least an order of magnitude greater than the first amount of time. The non-transitory machine-readable medium may also include wherein the machine comprises a controller and a variable frequency drive housed in a cabinet together, the generating the torque command in the slow integration control loop comprises receiving, by the programmable logic controller, the detected RPM and determining the torque command, and the generating the current adjustment command in the torque control loop comprises receiving, by the variable frequency drive, the torque command and determining the current adjustment command. The non-transitory machine-readable medium may also include wherein the machine comprises a speed control loop and the torque control loop, and is set to operate in the torque control loop instead of the speed control loop for the stick-slip vibration mitigation, and the torque command from the slow integration control loop is provided directly to the torque control loop instead of the speed control loop. The non-transitory machine-readable medium may also include receiving the detected RPM at the top drive for input into the slow integration control loop, wherein the top drive comprises a direct drive. The non-transitory machine-readable medium may also include detecting an amount of current output to the top drive; and deriving the amount of torque from the detected amount of current output.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus comprising:
a torque sensor configured to detect an amount of torque at a top drive coupled to a drill string of a drilling rig apparatus; and
a controller configured to:
generate, in a slow integration control loop, a torque command in response to a difference between a measured rotations per minute (RPM) of the top drive and a target RPM;
input the detected amount of torque from the torque sensor into a torque control loop;
determine, in the torque control loop, a torque difference in response to a comparison between the torque command from the slow integration control loop and the detected amount of torque; and
output, from the torque control loop, a current adjustment command based on the determined torque difference to the top drive for stick-slip vibration mitigation.

2. The apparatus of claim 1, wherein the torque sensor is configured to:
detect an amount of current utilized by a motor of the top drive; and
derive the amount of torque from the detected amount of current utilized.

3. The apparatus of claim 1, wherein:
the torque control loop comprises a first output time, the slow integration control loop comprises a second output time, and a speed control loop of the controller comprises a third output time, and
the first output time is at least an order of magnitude less than the second output time and is shorter than the second and third output times.

4. The apparatus of claim 1, wherein:
the controller comprises a first controller and a second controller that are separate from each other, and
the apparatus comprises a cabinet housing the first controller, the second controller, and the torque sensor.

5. The apparatus of claim 4, wherein:
the first controller comprises an external controller configured to implement the slow integration control loop, and
the second controller comprises a variable frequency drive configured to implement the torque control loop.

6. The apparatus of claim 1, wherein:
the controller comprises a speed control loop and the torque control loop, and is set to operate in the torque control loop instead of the speed control loop for the stick-slip vibration mitigation, and
the torque command from the slow integration control loop is provided directly to the torque control loop instead of the speed control loop.

7. The apparatus of claim 1, further comprising:
an RPM sensor configured to measure the RPM of the top drive, wherein the top drive comprises a direct drive, wherein the controller is further configured to:
compare the torque command to a speed limit; and
limit, in response to the comparison, the torque command to a bound of the speed limit.

8. A method, comprising:
generating, by a controller, a torque command based on a difference between a detected rotations per minute (RPM) at a top drive coupled to a drill string of a drilling rig apparatus and a target RPM in a slow integration control loop;
generating, by the controller, a current adjustment command based on a difference between a detected amount of torque at the top drive and the torque command in a torque control loop; and
sending, from the controller, the current adjustment command to the top drive to accelerate or decelerate the top drive for stick-slip vibration mitigation.

9. The method of claim 8, further comprising:
detecting, by a torque sensor, the amount of torque at the top drive; and
inputting the detected amount of torque from the torque sensor into the torque control loop.

10. The method of claim 9, wherein the detecting the amount of torque further comprises:
detecting, by the torque sensor, an amount of current output from the controller to the top drive; and
deriving the amount of torque from the detected amount of current output.

11. The method of claim 8, further comprising:
detecting, by an RPM sensor, the RPM at the top drive, wherein the top drive comprises a direct drive; and
inputting the detected RPM into the slow integration control loop.

12. The method of claim 8, further comprising:
completing, by the controller, the torque control loop in a first amount of time; and
completing, by the controller, the slow integration control loop in a second amount of time, wherein the second amount of time is at least an order of magnitude greater than the first amount of time.

13. The method of claim 8, further comprising:
bypassing, by the controller, a speed control loop of the controller with the torque command from the slow integration control loop to the torque control loop.

14. The method of claim 8, wherein:
the controller comprises an external controller and a variable frequency drive housed in a cabinet together,
the generating the torque command in the slow integration control loop comprises receiving, by the external controller, the detected RPM and determining the torque command, and
the generating the current adjustment command in the torque control loop comprises receiving, by the variable frequency drive, the torque command and determining the current adjustment command.

15. A non-transitory machine-readable medium having stored thereon machine-readable instructions executable to cause a machine to perform operations comprising:

generating a torque command based on a difference between a detected rotations per minute (RPM) at a top drive coupled to a drill string of a drilling rig apparatus and a target RPM in a slow integration control loop bounded by a speed limiter;

inputting a detected amount of torque from a torque sensor at the top drive, and the torque command, into a torque control loop;

generating a current adjustment command based on a difference between the detected amount of torque at the top drive and the torque command in the torque control loop; and sending the current adjustment command to the top drive for stick-slip vibration mitigation.

16. The non-transitory machine-readable medium of claim 15, the operations further comprising:

completing the torque control loop in a first amount of time; and completing the slow integration control loop in a second amount of time, wherein the second amount of time is at least an order of magnitude greater than the first amount of time.

17. The non-transitory machine-readable medium of claim 15, wherein:

the machine comprises a controller and a variable frequency drive housed in a cabinet together, the generating the torque command in the slow integration control loop comprises receiving, by the controller, the detected RPM and determining the torque command, and the generating the current adjustment command in the torque control loop comprises receiving, by the variable frequency drive, the torque command and determining the current adjustment command.

18. The non-transitory machine-readable medium of claim 15, wherein:

the machine comprises a speed control loop and the torque control loop, and is set to operate in the torque control loop instead of the speed control loop for the stick-slip vibration mitigation, and the torque command from the slow integration control loop is provided directly to the torque control loop instead of the speed control loop.

19. The non-transitory machine-readable medium of claim 15, the operations further comprising:

receiving the detected RPM at the top drive for input into the slow integration control loop, wherein the top drive comprises a direct drive.

20. The non-transitory machine-readable medium of claim 15, the operations further comprising:

detecting an amount of current output to the top drive; and deriving the amount of torque from the detected amount of current output.

* * * * *